(12) United States Patent
Pelletier et al.

(10) Patent No.: US 10,597,604 B2
(45) Date of Patent: Mar. 24, 2020

(54) STABLE ENCAPSULATED FRAGRANCE COMPOSITIONS

(71) Applicant: Henkel IP & Holding GmbH, Duesseldorf (DE)

(72) Inventors: Maxime Pelletier, Sandy Hook, CT (US); Artem Kirshon, West Hartford, CT (US); Ewa Urszula Sidwa, Fairfield, CT (US); Patrick Shane Akeem Harewood, Hamden, CT (US)

(73) Assignee: Henkel IP & Holding GmbH (DE)

( * ) Notice: Subject to any disclaimer, the term of this patent is extended or adjusted under 35 U.S.C. 154(b) by 106 days.

(21) Appl. No.: 15/808,991

(22) Filed: Nov. 10, 2017

(65) Prior Publication Data

US 2019/0144779 A1 May 16, 2019

(51) Int. Cl.

| | | |
|---|---|---|
| *B01J 13/22* | (2006.01) | |
| *C11B 9/00* | (2006.01) | |
| *C11D 3/37* | (2006.01) | |
| *C11D 3/22* | (2006.01) | |
| *C11D 3/08* | (2006.01) | |
| *C11D 3/50* | (2006.01) | |
| *C11D 3/12* | (2006.01) | |
| *D06M 23/12* | (2006.01) | |
| *C11D 3/04* | (2006.01) | |
| *B01J 13/04* | (2006.01) | |
| *C11D 17/00* | (2006.01) | |

(52) U.S. Cl.
CPC ............... *C11B 9/00* (2013.01); *B01J 13/043* (2013.01); *B01J 13/22* (2013.01); *C11D 3/046* (2013.01); *C11D 3/08* (2013.01); *C11D 3/124* (2013.01); *C11D 3/128* (2013.01); *C11D 3/1246* (2013.01); *C11D 3/221* (2013.01); *C11D 3/3719* (2013.01); *C11D 3/3723* (2013.01); *C11D 3/505* (2013.01); *C11D 17/0039* (2013.01); *D06M 23/12* (2013.01)

(58) Field of Classification Search
CPC ........... B01J 13/22; B01J 13/043; C11B 9/00; C11D 3/505; C11D 3/046; C11D 17/0039; C11D 3/124; C11D 3/1246; C11D 3/128; C11D 3/221; C11D 3/3719; C11D 3/3723; C11D 3/08; D06M 23/12
See application file for complete search history.

(56) References Cited

U.S. PATENT DOCUMENTS

| | | |
|---|---|---|
| 5,324,444 A | 6/1994 | Berry et al. |
| 6,024,943 A | 2/2000 | Ness et al. |
| 6,056,949 A | 5/2000 | Menzi et al. |
| 6,194,375 B1 | 2/2001 | Ness et al. |
| 6,458,754 B1 | 10/2002 | Velazquez et al. |
| 7,538,079 B2 * | 5/2009 | Warr ............... C11D 3/046 510/101 |
| 7,867,968 B1 | 1/2011 | Aouad |
| 7,871,976 B1 | 1/2011 | Aouad |
| 8,426,353 B2 | 4/2013 | Ouali et al. |
| 2007/0111919 A1 | 5/2007 | Boerefijn et al. |
| 2011/0190191 A1 | 8/2011 | Balgobind-Narain et al. |
| 2011/0224127 A1 | 9/2011 | Blyth et al. |

* cited by examiner

*Primary Examiner* — Irina S Zemel
(74) *Attorney, Agent, or Firm* — Bojuan Deng

(57) ABSTRACT

Provided herein are solid salt base or sugar base compositions for delivering encapsulated fragrance to textiles, and processes of making and using the compositions for treating textiles. It has been discovered that, during the manufacturing process, premixing a silicon compound and a salt base or sugar base before incorporating an encapsulated fragrance slurry to the salt base or sugar base significantly decreases the encapsulate breakage rate of the solid compositions. Solid encapsulated fragrance compositions prepared by the process allows consumers to experience a long-lasting freshness of their clothes after treating their clothes with the encapsulated fragrance compositions.

20 Claims, 3 Drawing Sheets

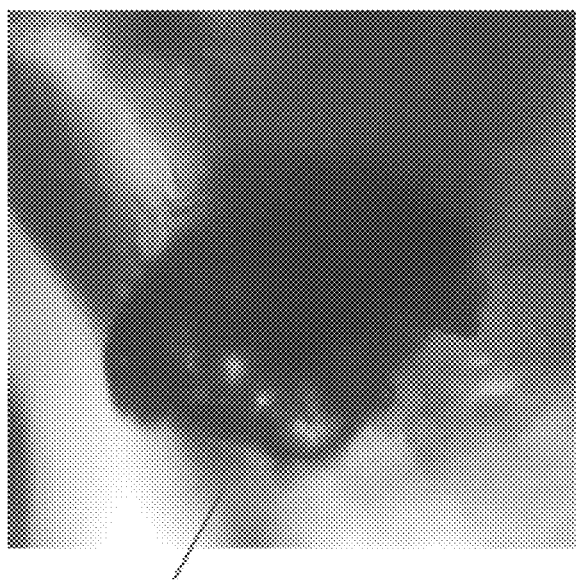
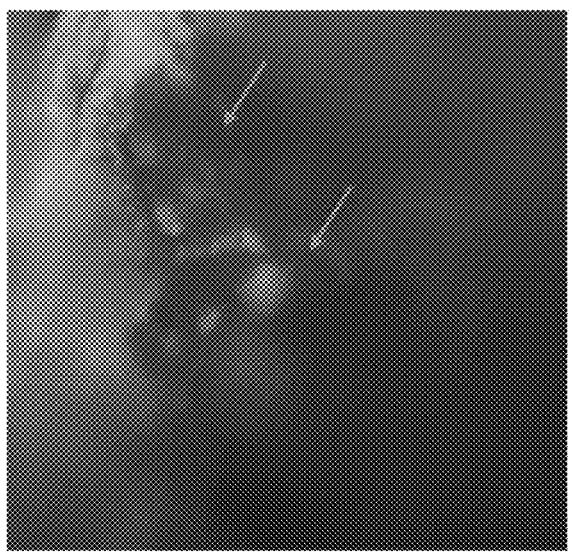
FIG. 3A
FIG. 3B

STABLE ENCAPSULATED FRAGRANCE COMPOSITIONS

FIELD OF THE INVENTION

This application relates to encapsulated fragrance compositions suitable for laundry care, dishwashing, and other home care product applications, and their use and manufacture.

BACKGROUND

Fragrances are composed of one or more volatile compounds, which can be continuously emitted from simple solutions and dry mixes to which they have been contained to provide a pleasant odor. Rate of fragrance emission is controlled by the delivery system in which fragrances are incorporated in. For example, a delivery system which carries fragrances in pure oil form may provide a surge release of the fragrances, while a delivery system containing encapsulated fragrances may provide a sustained release of the fragrances over an extended period of time.

Fragrances can be added to laundry care, dishwashing, and other home care products to provide a fresh, clean impression for the products and for the subjects treated with the products. In particular, fragrances are an important ingredient in successful commercial fabric care products because many consumers desire fragrances to be deposited on fabrics and remain on the fabrics for a longer length of time in order to convey a continuing impression of freshness.

Fragrances may be delivered together with a detersive agent during a wash cycle. For example, United States Patent Application Publication Nos. 2007/0111919 and 2011/0190191 disclose aggregate detergent granules in which fragrance encapsulates are anchored to detersive particles. The detergent granules can deliver fragrances and a detersive agent to fabrics simultaneously during a single wash.

However, fabrics may still have an undesirable smell or simply lack of a sufficient fresh smell after a wash cycle. To resolve the issues, fabrics may be treated with fabric softeners, and/or by additional treatments that are separate from their washing, to impart an esthetically pleasing odor. The treatments can be done, for example, in a washer during an added rinse cycle, or in a dryer. The separate treatments may employ solid or liquid fragrance compositions. A common problem of solid fragrance compositions is that they can be brittle and difficult to handle and/or manufacture.

U.S. Pat. No. 5,324,444 discloses a process for making free flowing perfume capsule compositions. The perfume capsule compositions essentially contain encapsulated perfumes and water, with the encapsulated perfumes being the major component, in an amount from about 80% to about 99% by weight of the composition. During the manufacturing process, silicon dioxide particles are added to the mixture of encapsulated perfumes and water, at the last manufacturing step, to dry the mixture and improve the flow property of the final capsule powders.

Since only a very small quantity of perfumes is needed to impart a pleasant odor in each laundry treatment, perfume capsule compositions which have a high concentration of perfume, for example as disclosed in U.S. Pat. No. 5,324,444, are not desirable for direct application onto fabrics. This is because dose accuracy may be compromised because of the difficulty in measuring and transferring a very small amount of the highly-concentrated materials. In fact, U.S. Pat. No. 5,324,444 discloses that the perfume capsules are used to prepare a stock detergent composition such that the perfume concentration is significantly diluted. Specifically, about 1% of the highly-concentrated perfume capsule composition is added to a detergent formulation to prepare the stock detergent composition which, in turn, is used for fabric treatment.

U.S. Pat. Nos. 7,867,968 and 7,871,976 relate to scent additives for textiles which comprise from about 80% to about 90% by weight of polyethylene glycol ("PEG") and from about 4% to 24% by weight of one or more free and/or encapsulated perfumes. The scent additives may be used directly to deliver fragrances to textiles. However, the manufacturing process of the scent additives requires a high processing temperature to melt PEG and keep it molten for mixing with perfumes.

Accordingly, there remains a need for solid compositions to effectively and conveniently deliver fragrance to textiles. Preferably, the solid fragrance compositions can be easily prepared. More preferably, the solid fragrance compositions are storage stable, not brittle, and have an improved flow property profile.

SUMMARY OF THE INVENTION

Solid compositions for delivering fragrance to textiles are prepared by incorporating a free fragrance and/or an encapsulated fragrance slurry into the solid compositions. One type of the solid compositions is a salt composition. It has been noted by the inventors of the present application that, when a solid composition contains a high concentration of a salt (which can also be called a salt base), directly adding an encapsulated fragrance slurry into the salt base leads to a very high percentage (about 90%) of broken fragrance encapsulates in the final solid composition. This is known as a direct addition method. While a free fragrance provides an immediate release of the fragrance, the encapsulated fragrance provides a sustained release. Broken fragrance encapsulates affect the performance of the fragrance product. One way to overcome the problem associated with the direct addition method is to prepare a starch slurry with fragrance encapsulates and spray it into hot air allowing the perfume encapsulates to dry (also known as spray-dry) to provide a layer of starch protection on the fragrance encapsulates before incorporating them into the salt base. However, this process requires extra steps of preparing starch slurry, spraying the starch slurry onto the encapsulates, and drying the resulting encapsulates, which significantly increases the process cost.

The inventors have surprisingly found that an addition of a silicon compound (e.g., silicon dioxide) in the salt base to form a premix before incorporating an encapsulated fragrance slurry to the salt base premix significantly decreases the encapsulate breakage of the final solid composition (the breakage rate reduced by about 50%). It is known that silicon dioxide particles may be added to the mixture of encapsulated perfumes and salts, at the last manufacturing step, to improve the flow property of the final capsule powders and further dry the capsule powders in the direct addition method. However, the addition of silicon dioxide at the end of the process does not greatly reduce the rate of capsule breakage. Moreover, it has been discovered by the inventors of the present application that the weight ratio of silicon dioxide initially added in the salt base and encapsulated fragrances in the composition is important to minimize the capsule breakage. Too much or too little silicon dioxide may both increase the percentage of broken fragrance capsules, which may lead to acceptable but not most optimal results. Moreover, the ratio needs to be adjusted as a function of the free oil added to the solid formulation. It is further discovered that a sugar base may be used, in lieu of a salt base or sugar base, to prepare a stable solid fragrance with a desirable fragrance release profile.

The blending of a silicon compound and a salt base or sugar base can be performed by using a conventional mixer known in the art at a room temperature. The overall process, although including an extra step of blending the silicon compound and the salt base or sugar base, is still simple, easy, and cheap.

One aspect of the present invention provides a process for preparing an encapsulated fragrance composition. The process comprises the steps of blending a salt base or sugar base in an amount from about 50% to about 99.5% by weight of the composition, a free fragrance in an amount from 0% to less than 10% and a silicon compound in an amount from about 0.01% to about 10% by weight of the composition to form a first mixture, blending the first mixture and an encapsulated fragrance slurry in an amount from about 0.01% to about 20% by weight of the composition to obtain a second mixture. In some embodiments, the free fragrance is in an amount from 0% to less than 8%, from 0% to less than 5%, from 0% to less than 2.5%, from 0% to less than 2.3%, or from 0% to less than 2.0% by weight, from 0% to about 1.8% by weight, from 0% to about 1.5% by weight, from about 0.01% to about 1.5% by weight, from about 1.0% to about 1.5%, from 0.05% to about 1.4%, from about 0.5% to about 1.4% by weight, or about 1.0% to about 1.3% by weight, or about 1.0% by weight.

The term "encapsulated fragrance slurry" refers to a composition comprising water and encapsulated fragrance wherein the encapsulated fragrance is suspended in water. Typically, the encapsulated fragrance slurry contains about 30% to about 40% of the encapsulated fragrance and about 60% to about 70% of water, by weight of the encapsulated fragrance slurry, as in a commercially available form. The encapsulated fragrance can also be called as an active in the slurry. However, a person of ordinary skilled in the art would understand that a different concentration of encapsulated fragrance slurry may also be used to practice the invention. In some embodiments, the silicon compound is selected from a group consisting of silicon dioxide, fumed silica, precipitated silica, aluminosilicate, sodium silicate, potassium silicate, calcium silicate, and a mixture thereof. In some embodiments, a preferred silicon compound is silicon dioxide.

In some embodiments, the salt base may comprise a water soluble inorganic salt. Preferably, the inorganic salt is sodium chloride. In some embodiments, the sugar base comprises a sugar selected from a group consisting of glucose, fructose, galactose, sucrose, maltose, lactose, saccharose and a mixture thereof.

The encapsulated fragrance slurry comprises fragrance microcapsules (can also be called fragrance encapsulates) and water. The fragrance microcapsules may have a core-shell structure. Namely, the fragrance encapsulates comprise microcapsules (shell) and a fragrance (core) entrapped in the microcapsules. In one embodiment, the fragrance microcapsules include a melamine/formaldehyde shell covering a fragrance core. Other capsules or microcapsules may be used, which include but are not limited to, a melamine acrylate/acrylamide shell. The fragrance may include, but is not limited to, an ester, an ether, an aldehyde, a ketone, an alcohol, a hydrocarbon, or a combination thereof.

According to some embodiments, the salt base or sugar base further comprises an alcoholic solvent, and one or both of a colorant and a free fragrance. The alcoholic solvent may serve as a carrier for the oil and the free fragrance. In some embodiments, the alcoholic solvent is a glycol. In preferred embodiments, the alcoholic solvent is organcipropylene glycol or dipropylene glycol. It has been noticed that in some embodiments, an additional solvent may alter the optimum silicon compound/capsule slurry ratio.

The free fragrance may be selected from a group consisting of an ester, an ether, an aldehyde, a ketone, an alcohol, a hydrocarbon, or a combination thereof, which may be in the form of an oil. The free fragrance oil affects the product fragrance release profile because it allows an immediate release of the fragrance. However, as stated before, too much free fragrance oil may affect the protection of the encapsulated fragrances provided by the silicon compound. The free fragrance oil may be in an amount from 0% to about less than 10% by weight of the composition. In some embodiments, the free fragrance oil is in an amount from 0% to less than 8%, from 0% to less than 5%, from 0% to less than 2.5%, from 0% to less than 2.3%, or from 0% to less than 2.0% by weight, from 0% to about 1.8% by weight, from 0% to about 1.5% by weight, from 0.01% to about 1.5% by weight, from about 1.0% to about 1.5%, from 0.05% to about 1.4%, from about 0.5% to about 1.4% by weight, or about 1.0% to about 1.3% by weight, or about 1.0% by weight.

It has been noticed that the amount of the silicon compound initially added in the salt base or sugar base, relative to the amount of fragrance encapsulates in the composition, is important to minimize the breakage of the fragrance capsules in the resulting solid composition. The silicon compound added in the salt base or sugar base, prior to mixing with an encapsulated fragrance slurry, can be referred as the first batch silicon compound because, optionally, one or more subsequent batches of silicon compound may be added to the composition. In some embodiments, the weight ratio of the first batch silicon compound and the fragrance encapsulate slurry in the composition ranges from 0.01 to 0.5, from 0.025 to 0.3, from 0.05 to 0.25, from 0.1 to 0.2, or 0.13. In other embodiments, the weight ratio of the first batch silicon compound and the active fragrance encapsulates (dry encapsulates only) in the composition ranges from 0.3 to 2.5, from 0.3 to 1.5, from 0.4 to 1.0, from 0.4 to 0.8, or from 0.4 to 0.6, or 0.44. It has been noticed that the free fragrance oil amount in the composition may affect the preferred weight ratio of the first batch silicon compound and the fragrance encapsulate slurry.

In other embodiments, the salt base or sugar base may further comprise any additives commonly used in fabric care or dishwashing products.

The process of the present invention may comprise an additional step of blending the second mixture and another freshly added silicon compound, to further absorb water, if any, from the composition and further improve the free flowing of the resulting composition. In some embodiments, the composition is solid, having a water content in an amount of less than 15% by weight of the composition. In preferred embodiments, the composition is substantially free of free water. By free water, it refers to water molecules which are not bound to another compound (e.g., silicon dioxide) and can freely dissolve other ingredients. However, such non-free water, counts for the water content in the composition.

The newly added silicon compound may be selected from a group consisting of silicon dioxide, fumed silica, precipitated silica, aluminosilicate, sodium silicate, potassium silicate, calcium silicate, and a mixture thereof. In some embodiments, the newly added silicon compound is silicon dioxide in an amount from about 0.01% to about 10% by weight of the composition.

Another aspect of the present invention provides a solid encapsulated fragrance composition comprising: (a) a salt base or sugar base in an amount from about 50% to about 99.5% by weight of the composition; (b) a silicon compound in an amount from about 0.01% to about 20% by weight of the composition, wherein the silicon compound is selected from a group consisting of silicon dioxide, fumed silica, precipitated silica, aluminosilicate, sodium silicate, potassium silicate, calcium silicate, and a mixture thereof; and (c) fragrance encapsulates slurry in an amount from about 0.01% to about 20% by weight of the composition, wherein the fragrance encapsulates comprise microcapsules and a fragrance entrapped in the microcapsules. In some embodiments, the composition may further comprise one or more of a free fragrance, a dye, and an organic solvent as a carrier for the free fragrance and/or the dye. The encapsulated fragrance composition may be prepared by the inventive process as described herein.

The types of the salt base or sugar base, the silicon compound, and the encapsulated fragrance slurry, and the respective acceptable and preferable amounts thereof, suitable for the encapsulated fragrance composition, are essentially the same as those used in the inventive process described herein.

In some embodiments, the composition contains water in an amount from less than 15% by weight, less than 10% by weight, less than 8%, less than 5% by weight, less than 3% by weight, less than 2% by weight, less than 1% by weight, less than 0.5% by weight, or substantially free of the composition. In those embodiments, water is not removed from the composition, rather, silicon dioxide or other drying agent is added to absorb water and/or form an aggregate with water so that the composition, in a final form, is free flowing. In other embodiments, more than 10% water (e.g. up to about 30% water) can be added as long as water would not dissolve the salt, the sugar, or the film of a unit dose pac if the product is in a unit dose form. For example, water can be partially removed during the process so that a free flowing form final product can be delivered; or water containing crystals are formed during the process such that more water will be retained in the composition but does not affect the stability and apparent dryness of the product.

In some embodiments, the microcapsules have a melamine/formaldehyde shell, and the fragrance in the fragrance encapsulate is an ester, an ether, an aldehyde, a ketone, an alcohol, a hydrocarbon, or a combination thereof.

In further embodiments, the organic solvent, which is used as a carrier for the colorant and the free fragrance, is propylene glycol, dipropylene glycol, or a combination thereof.

In some embodiments, the solid fragrances are packed in conventional bottles. In others, the solid fragrances are packed individually as unit doses prior to being packed into a larger container. As such, the present invention provides a unit dose supply of solid fragrance. Preferably, the unit dose fragrance is packed with a water-soluble polymer film.

A further aspect of the present invention provides a method for delivering fragrances to fabrics, silverware, or any household products by subjecting the fabrics, the silverware, or the household products in contact with an encapsulated fragrance composition as described herein.

Yet an additional aspect of the present invention is to make a detergent formulation by incorporating the inventive encapsulated fragrance composition. The detergent formulation may comprise at least one detersive surfactant and the solid fragrance composition in accordance with the present invention, packed in a conventional container or in a unit dose package. Preferably, a multi-chamber unit dose detergent formulation may be provided, with a detersive composition in one chamber and the solid fragrance composition in another chamber.

BRIEF DESCRIPTION OF THE FIGURES

The figures are images of the encapsulates (pointed by the arrows), after mixing with the salt, which are subjected to Olympus BH-2 light microscope and magnifying for 100×-200×.

FIGS. 2A and 3B show the images of the encapsulates, after mixing with a salt (such salt has not been premixed with silicon dioxide), and then further mixed with silicon dioxide. Some evidence of agglomeration with slurry is seen but most of the mixing has already occurred. Some capsules are observed not to agglomerate when silicon dioxide is added after the slurry.

FIGS. 3A and 3B show the images of the encapsulates, after mixing with a pre-treated salt (such salt has been premixed with silicon dioxide). Silicon dioxide is seen to agglomerate with slurry forming protected particles early in the mixing.

DETAILED DESCRIPTION OF THE INVENTION

Definitions

Figure 1A:
FIGS. 1A and 1B show the images of the encapsulates, after mixing with a salt (such salt has not been premixed with silicon dioxide). The images show capsules exposed to friction on the surface of the salt, some capsules are seen to be damaged.

All of the various aspects, embodiments, and options disclosed herein can be combined in any and all variants unless otherwise specified. Terms in this application control in the event of a conflict with a patent or publication term that is incorporated by reference.

As used herein, "a," "an," or "the" means one or more unless otherwise specified.

Open terms such as "include," "including," "contain," "containing" and the like mean "comprising." The term "or" can be conjunctive or disjunctive.

Some inventive embodiments contemplate numerical ranges. Every numerical range provided herein includes the range endpoints as individual inventive embodiments. When a numerical range is provided, all individual values and sub-ranges therein are present as if explicitly written out.

The term "about" includes the recited number±10%. For example, "about 10" means 9 to 11.

The phrase "substantially free of" means that a composition contains little no specified ingredient/component, such as less than about 5% by weight, less than about 4% by weight, less than about 3% by weight, less than about 2% by weight, or less than about 1% by weight of the specified ingredient.

As used herein, the "%" described in the present application refers to the weight percentage unless otherwise indicated.

Unless states otherwise, the term "by weight of the composition" refers to a composition of a final product derived from a process, unless otherwise defined.

The terms "textile" and "fabric" can be used interchangeably.

The terms "fragrance" and "perfume" can be used interchangeably.

The terms "capsule", "microcapsule", and "encapsulate" can be used interchangeably.

The terms "process" and "method" can be used interchangeably.

The term "fragrance encapsulate" refers a core-shell structure which comprises a microcapsule (shell) and a fragrance (core) entrapped in the microcapsule. The weight of a fragrance encapsulate is the sum of the weight of the microcapsule and the weight of the fragrance (core) entrapped in the microcapsule.

The term "fragrance encapsulate slurry" refers a core-shell structure which comprises a microcapsule (shell) and a fragrance (core) entrapped in the microcapsule and the water and other ingredients that compose a commercially available fragrance encapsulate slurry. The weight of a fragrance encapsulate slurry is the sum of the weight of the microcapsule, the weight of the fragrance (core) entrapped in the microcapsule, the weight of the water and the weight of the other ingredients.

The term "encapsulated fragrance" refers a fragrance entrapped in the microcapsule. The weight of an encapsulated fragrance is the weight of the fragrance entrapped in the microcapsule, not including the weight of the microcapsule.

The term "free fragrance" means fragrance which is not encapsulated, which is also used interchangeably with the term "neat fragrance" or "fragrance oil."

The term "dry" when used to describe fragrance or fragrance encapsulate also means free flowing. For example, when silicon dioxide is added to an encapsulated fragrance slurry, the silicon dioxide absorbs water in the slurry and makes the encapsulated fragrance free flowing.

The term in a singular or plural form can mean both singular and plural forms. For example, "textile" or "textiles" may mean both textiles and textile; and "encapsulate" or "encapsulates" may mean both encapsulate and encapsulates.

The act of treating a textile can refer to, for example, one or more of: i) applying a perfume to a textile; ii) softening a textile; iii) applying a perfume to and softening a textile; iv) cleaning a textile; v) rendering the textile resistant to static build up during drying; or vi) cleaning a textile and applying a perfume to and softening a textile and rendering the textile resistant to static build up during drying; or any combination thereof.

Unless stated otherwise, molecular weight of a polymer refers to weight average molecular weight.

Processes for Preparing an Encapsulated Fragrance Composition

In one aspect, the present invention provides a process for preparing an encapsulated fragrance composition. In some embodiments, the process comprises the steps of blending and mixing a salt base or sugar base, in a powder form, in an amount from about 50% to about 99.5% by weight of the composition, and a silicon compound in an amount from about 0.01% to about 10% by weight of the composition for a sufficient time and optionally, further blending and adding a free fragrance in an amount form about 0% to less than 10%, to form a first mixture, followed by blending and mixing the first mixture with an encapsulated fragrance slurry, in an amount from about 0.01% to about 20% by weight of the composition, for a sufficient time, to obtain a second mixture. Optionally, the second mixture is allowed to shape, dry, and/or harden. By the term "shape", "allow to shape", or the like, this refers to any step in which the mixture is portioned and thereafter worked on by natural or applied forces to take a final shape prior to the mixture hardening.

Accordingly, unless stated otherwise, the term "the composition(s)" as used throughout the specification, refers to a solid composition comprising a salt base or sugar base, a silicon compound, encapsulated fragrances slurry, and optionally a free fragrance and residual water. The composition can impart fragrances to a textile upon treating the textile with the composition.

In other embodiments, a process for preparing an encapsulated fragrance composition in accordance with the present invention comprises the steps of blending and mixing a free fragrance in an amount form about 0% to less than 10% with a salt base or sugar base in an amount from about 50% to about 99.5% by weight of the composition until homogeneous, followed by blending and mixing with a silicon compound in an amount from about 0.01% to about 10% by weight of the composition for a sufficient time until homogeneous to form a first mixture, followed by further blending and mixing the first mixture with an encapsulated fragrance slurry in an amount from about 0.01% to about 20% by weight of the composition, for a sufficient time, to obtain a second mixture. Optionally, the second mixture is allowed to shape, dry, and/or harden.

The process of the present invention is particularly useful for preparing an encapsulated fragrance composition wherein the composition contains a large percentage of a salt, which may serve as a solid carrier (i.e., salt base or sugar base). It has been noted directly adding an encapsulated fragrance slurry into the salt base or sugar base leads to a very high percentage (up to 88%) of broken fragrance encapsulates in the final solid composition.

Figure 1B:
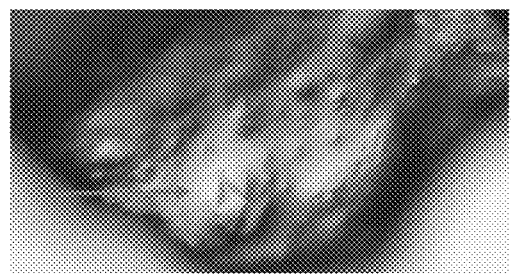
Figure 2A:
Figure 2B:
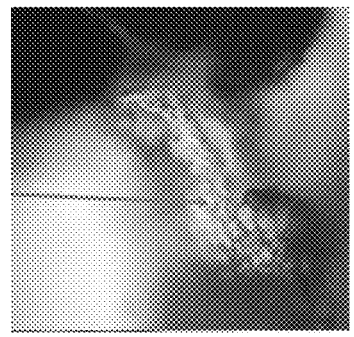

Without wishing to be bound by theory, it is believed that a salt negatively affects the integrity of fragrance encapsulates by weakening the shell structure of the encapsulates and the friction during the mixing causes the fragrances therein to be prematurely released. FIGS. 1A and 1B show the images of the encapsulates, after mixing with a salt (such salt is not premixed with silicon dioxide). The arrows point to the capsules, some of which are broken. Adding silicon dioxide at the last process step shows incomplete agglomeration after capsule damage already incurred, as shown in FIGS. 2A and 2B, wherein the arrows point to the capsules.

In the past, another layer of protection around the encapsulates is created to overcome the high breakage problem. A starch and fragrance encapsulate slurry is prepared and spray-dry to provide a layer of starch (a second shell) protection to the encapsulates before incorporating them into the salt base or sugar base. The resulting capsules may be called double shell fragrance capsules. However, preparing the double shell fragrance capsules significantly increases the process cost.

It has been surprisingly discovered by the inventors that an addition of a silicon compound (e.g., silicon dioxide), even in a very small quantity, in the salt base or sugar base before incorporating an encapsulated fragrance slurry to the salt base or sugar base significantly decreases (by about 50% decrease) the encapsulate breakage of the final solid composition.

Silicon dioxide is known to be added at the end of a fragrance formulation process to absorb residual water from a mixture of fragrances and water, and to create a free-flowing powder thereof, as disclosed in U.S. Pat. No. 5,324,444. However, it is not known that silicon dioxide may significantly reduce the breakage of the encapsulates in a salt base or sugar base composition if silicon dioxide is premixed with the salt base or sugar base during the process. It is unexpected that even a very small amount of silicon dioxide premixed with the salt base or sugar base can significantly improve the stability of the encapsulated fragrance composition. In contrast, subsequently added silicon dioxide, for example, those added after encapsulated fragrances and a salt base or sugar base have already been blended, does not have the same stability improvement effect on the final solid composition, as silicon dioxide added initially to the salt base or sugar base. Moreover, it has been discovered that the amount of silicon dioxide added initially to the salt base or sugar base composition is critical for the stability of the encapsulated fragrance composition. Too much or too little of the initially added silicon dioxide, relative to the amount of fragrances, may both increase the percentage of broken fragrance capsules.

Without wishing to be bound by theory, it is believed that silicon dioxide, when added to the salt base or sugar base, form aggregates with the water in the fragrance encapsulate slurry to create and secondary barrier in-situ. The silicon dioxide may also effectively dilute the salt concentration and reduces the contact between the salt and the encapsulates to a level that significantly limits the salt from breaking the shell structure of the encapsulates. FIGS. 3A and 3B show the images of the aggregates of silicon dioxide, premixed with a salt, and the encapsulates.

In accordance with the present invention, the blending and mixing steps can be accomplished by drum mixing, rotating, ribbon blending, baffled drum blending, or spraying and drying. The mixer can be, for example, a low-shear overhead mixer with a 3-bladed propeller. It may also be a static or high-shear mixer suitable for batch mixing and in-line mixing. It may also be a Kitchenaid mixer. In some embodiments, a drum or baffled drum is employed, since it gently but completely mixes the components without damaging the perfume capsules. In some embodiments, the encapsulated fragrance slurry is sprayed onto the first mixture (i.e., the salt base or sugar base mixture with a silicon compound) to form the second mixture by using a compatible spraying equipment.

A sufficient amount of time for blending and mixing can be, for example, the amount of time required to cause the color of the mixture to lighten or to cause the mixture homogeneous. A sufficient amount of time can depend on the mixing conditions. For example, a sufficient amount of time can be lower with a higher agitation or whipping rate, and conversely, a sufficient amount of time can be higher with a lower agitation or whipping rate. A sufficient amount of time can also depend on the amount of materials to be mixed.

The salt base or sugar base may also comprise other ingredients, such as a colorant, a dispersant, a free fragrance, enzymes, a bleach, a filler, a dye, and the like, to impart with the final solid compositions with different adjunctive properties. The other ingredients may be premixed, optionally by use of a solvent, before being combined with the salt or sugar to form the salt base or sugar base.

Furthermore, the process of the present invention may comprise a step of blending the second mixture and another newly added silicon compound in an amount from about 0.01% to about 10% by weight of the composition. The new silicon compound can absorb water, if any, from the mixture and improve the free flowing of the final composition in its powder form. The new batch of the silicon compound may also be selected from a group consisting of silicon dioxide, fumed silica, precipitated silica, aluminosilicate, sodium silicate, potassium silicate, calcium silicate, and a mixture thereof. In preferred embodiments, the newly added silicon compound is silicon dioxide in an amount from about 0.05% to about 5% by weight, from about 0.1% to about 2.5% by weight, or from about 2% by weight of the composition.

In some embodiments, the process may further comprise the step of adding an additional batch of silicon dioxide, to facilitating the drying the mixture and improving the free flow of the final product.

The process of the present invention provides a simple and cost effective approach to lower the percentage of broken encapsulates typically associated with a high salt content and low encapsulate content composition, compared to a double shell protection method currently used to prevent encapsulate breakage. To prepare a fragrance with double shells, a starch slurry is prepared and spray dried into a powder then added separately to the base. The resulting double-shell encapsulates are then incorporated to the solid composition. While the percentage of broken double-shell encapsulates is reduced by the double-shell encapsulation method, the process cost is increased. Advantageously, the process of the present invention, which merely requires premixing a silicon compound and the salt before the fragrance encapsulates are incorporated, reduces the complexity and cost of spray drying a solution of starch and encapsulated fragrance slurry to create double shell encapsulates.

Ingredients of an Encapsulated Fragrance Composition

Salt Base and Sugar Base

Salt base suitable for use in the present invention may comprise an inorganic salt, preferably is water soluble. Such inorganic salt may include, but is not limited to, an alkali metal salt, an alkaline earth metal salt, and combinations thereof, as long as they are water soluble.

Preferably, the inorganic salt is an alkali metal salt, which may include, for example, salts of lithium, sodium, potassium, or any combination thereof. Useful alkali metal salts can be, for example, alkali metal fluorides, chlorides, bromides, iodides, sulfates, bisulfates, phosphates, monohydrogen phosphates, dihydrogen phosphates, carbonates, monohydrogen carbonates, acetates, citrates, lactates, pyruvates, silicates, ascorbates, or any combination thereof. More preferably, the inorganic salt is sodium chloride or sodium acetate. Even more preferably, the inorganic salt is sodium chloride.

The sugar base may comprises a sugar selected from a group consisting of glucose, fructose, galactose, sucrose, maltose, lactose, saccharose and a mixture thereof.

In some embodiments, the salt base or sugar base may be present in an amount from about 50% to about 99.5% by weight, from about 70% to about 99.5% by weight, from about 80% to about 99% by weight, from about 85% to about 98.5% by weight, from about 88% to about 95% by weight, or from about 90% to about 95% by weight of the composition. In other embodiments, the salt base or sugar base may be present in an amount from about 70% to about 75% by weight, from about 75% to about 80% by weight, from about 80% to about 85% by weight, from about 85% to about 90% by weight, or from about 88% to about 93% by weight of the composition.

In some embodiments, the salt base or sugar base further comprises a colorant, a dispersant, a free fragrance, enzymes, a bleach, a filler, a dye, and the like. In preferred embodiments, the salt base or sugar base comprises a salt, a colorant, a fragrance oil, and/or an alcoholic solvent. The alcoholic solvent may be a glycol. More preferably, the alcoholic solvent is propylene glycol, dipropylene glycol, or a combination thereof. The organic solvent may be present in an amount from about 0% to about 5.0%, from above 0% to about 2.0%, from above 0% to about 1.0%, by weight of the composition.

Fragrances

Fragrances refer to and include any fragrant substance or mixture of substances including natural (obtained by extraction of flowers, herbs, leaves, roots, barks, wood, blossoms or plants), artificial (mixture of natural oils or oil constituents) and synthetically produced odoriferous substances. Fragrances or perfumes suitable for the present invention can be an ester, an ether, an aldehyde, a ketone, an alcohol, a hydrocarbon, or a combination thereof. Fragrances or perfumes can have, for example, a musky scent, a putrid scent, a pungent scent, a camphoraceous scent, an ethereal scent, a floral scent, a peppermint scent, or any combination thereof.

Fragrances may be provided in encapsulated form or a pure, neat oil form.

Fragrance oil suitable for use in the present invention may be selected from a group consisting of an ester, an ether, an aldehyde, a ketone, an alcohol, a hydrocarbon, and a combination thereof. Fragrance oil provides an immediate release of the fragrance upon use.

The amount of fragrance provided by the free fragrance in the solid composition can range from 0% to about less than 10% by weight, from 0% to less than 8%, from 0% to less than 5%, from 0% to less than 2.5%, from 0% to less than 2.3%, or from 0% to less than 2.0% by weight, from 0% to about 1.8% by weight, from 0% to about 1.5% by weight, from about 0.01% to about 1.5% by weight, from about 1.0% to about 1.5%, from 0.05% to about 1.4%, from about 0.5% to about 1.4% by weight, or about 1.0% to about 1.3% by weight, or about 1.0% by weight, based on the total weight of the composition.

Fragrances may also be provided in an encapsulated form to sustain-release the fragrances entrapped in microcapsules over a long period. The term "encapsulate" is used to describe a method of protecting a fragrance core. Free fragrance may be either a spray-dried emulsion of discrete microdroplets or a fragrance core surrounded by a polymerized outer coating (capsule or shell) which is impervious to the materials in the fragrance core and the materials which may come in contact with the outer surface of the shell. Encapsulated fragrance can also be described as microcapsules or nanocapsules having a core-shell structure.

The microcapsules and nanocapsules can be water-soluble or water-insoluble. Examples of other suitable encapsulated fragrances are described in, for example, U.S. Pat. Nos. 6,024,943, 6,056,949, 6,194,375, 6,458,754 and 8,426,353, and US 2011/0224127 A1, each of which is incorporated by reference in its entirety. In one embodiment, the fragrance microcapsule includes a melamine/formaldehyde shell.

An encapsulated fragrance slurry refers to a suspension or a solution comprising encapsulated fragrances and water. In some embodiments, the encapsulated fragrance slurry comprises from about 0.01% to about 20% by weight, from about 0.02% by weight to about 15% by weight, from about 0.03% by weight to about 10% by weight, from about 0.04% by weight to about 5% by weight, based on the total weight of the composition.

The free fragrance described above, provides an immediate release of a pleasing odor, while the encapsulated fragrance provides a sustained release of a pleasing odor. Together, the free and encapsulated fragrances determine the total amount of fragrances and a release profile of the solid fragrance composition.

According to some embodiments, the total amount of fragrances, provided by free fragrance and encapsulated fragrance, in the solid composition can range, for example, from about 0.01% to about 15% by weight, from about 0.01% to about 12% by weight, from about 0.02% to about 10% by weight, from about 0.02% to about 8% by weight, from about 0.1% to about 6% by weight, from about 0.5% to about 5% by weight, from about 0.7% to about 4% by weight, from about 1% to about 3% by weight, or from about 1.5% by weight to about 2% by weight, based on the total weight of the composition.

The Silicon Compound

Silicon compound suitable for the present invention may include, but are not limited to, silicon dioxide, fumed silica, precipitated silica, aluminosilicate, sodium silicate, potassium silicate, calcium silicate, and a mixture thereof. A preferred silicon compound is silicon dioxide, which is commercially available, for example, under the trade name Zeofree 5161.

The silicon compound added initially to the salt base or sugar base, before the salt base or sugar base is mixed with the fragrance capsules, may range from about 0.01% to about 10% by weight, from about 0.01% to about 8% by weight, from about 0.025% to about 5% by weight, from about 0.05% to about 2% by weight, from about 0.1% to about 1.5% by weight, or from about 0.2% to about 1% by weight of the composition.

As discussed previously, a new or second batch of silicon compound may be added to a mixture of the salt base or sugar base and the encapsulated fragrance to absorb water and/or improve the air flow of the solid composition, which is preferably in the form of a powder.

The second batch of silicon compound used in the composition may range from about 0.01% to about 10% by weight, from about 0.025% to about 5% by weight, from about 0.05% to about 2.5% by weight, about 0.05% to about 1.5% by weight, or about 0.1% to about 1.5% by weight of the composition.

Weight Ratio of the Silicon Compound Added to the Salt Base or Sugar Base and the Fragrance Encapsulates Any ratio of silicon compound and the fragrance encapsulate slurry may be used to reduce the breakage rate of the fragrance encapsulates as long as the silicon compound (also referred as the first batch silicon compound) is premixed with the salt base or sugar base before incorporating the fragrance encapsulates. However, the weight ratio of the first batch silicon compound and the fragrance encapsulates in certain ranges is particularly advantageous in preventing or reducing the breakage rate. The weight ratio is affected by the amount of free fragrance in the composition. The more free fragrance used, the more silicon compound is needed to protect the encapsulates.

In some embodiments, the weight ratio of the first batch silicon compound and the fragrance encapsulate slurry in the composition ranges from 0.01 to 0.5, from 0.025 to 0.3, from 0.05 to 0.25, from 0.1 to 0.2, or 0.13. In other embodiments, the weight ratio of the first batch silicon compound and the active fragrance encapsulates (dry encapsulates only) in the composition ranges from 0.3 to 2.5, from 0.3 to 1.5, from 0.4 to 1.0, from 0.4 to 0.8, or from 0.4 to 0.6, or 0.44.

Water in the Composition

In some embodiments, water is not removed from the composition, rather, silicon dioxide or other drying agent is added to absorb water and/or form an aggregate with water so that the composition, in a final form, is free flowing. In those embodiments, water presented in the composition may range from less than 15% by weight, less than 10% by weight, less than 5% by weight, less than 3% by weight, less than 2% by weight, less than 1% by weight, less than 0.5% by weight, or substantially free of the composition.

In other embodiments, more than 10% water (e.g. up to about 30% water) can be added as long as water would not dissolve the salt, the sugar, or the film of a unit dose pac if the product is in a unit dose form. For example, water can be partially removed during the process so that a free flowing form final product can be delivered; or water containing crystals are formed during the process such that more water will be retained in the composition but does not affect the stability and apparent dryness of the product.

Colorant(s)

In some embodiments, the composition does not contain a colorant.

In some embodiments, the composition contains one or more colorants, for example, polymers, dyes, water-soluble polymers, water-soluble dyes, water-insoluble polymers, water-insoluble dyes, or a mixture thereof.

The colorant(s) include those that are known in the art, or commercially available from dye or chemical manufacturers.

The color of the colorant(s) is not limited, and can be, for example, red, orange, yellow, green, blue, indigo, violet, or any combination thereof.

The colorant(s) can be, for example, one or more Milliken LIQUITINT® colorants: VIOLET LS, ROYAL MC, BLUE HP, BLUE MC, AQUAMARINE, GREEN HMC, BRIGHT YELLOW, YELLOW LP, YELLOW BL, BRILLIANT ORANGE, CRIMSON, RED MX, PINK AL, RED BL, RED ST, or any combination thereof.

The total amount of the one or more colorant(s) that can be included in the composition, for example, can range from about 0.00001% by weight to about 0.15% by weight, from about 0.0001% by weight to about 0.1% by weight, from about 0.001% by weight to about 0.1% by weight, or from about 0.005% by weight to about 0.1% by weight, based on the total weight of the composition. The total amount of colorant(s) in the composition can be, for example, about 0.0001% by weight, about 0.001% by weight, about 0.01% by weight, about 0.05% by weight, about 0.08% by weight, or about 0.1% by weight, based on the total weight of the composition.

Solid Encapsulated Fragrance Composition ("the Composition")

In another aspect, the present invention provides a solid encapsulated fragrance composition which allows for a high concentration of a salt base or sugar base (up to about 99.5% by weight) and relatively a low concentration of perfume, while at the same time has an improve stability profile, as evidenced by the reduced capsule-break rate. Compared to a highly-concentrated fragrance composition, the composition of the present invention is easier to measure, transfer, and handle and can be applied directly to a subject to impart a pleasant odor.

The fragrance of the composition may be provided by encapsulated fragrance, which allows for an extended release of the fragrance. In some embodiments, the fragrance of the composition may be provided by both a free fragrance and an encapsulated fragrance, which provides customers an immediate freshness feeling as well as a long-lasting freshness feeling.

The composition also has an improved stability profile. The perfume capsules are less prone to breakage during manufacturing, transport, and/or storage, compared to the solid fragrance encapsulates known in the art. This greatly improves the shelf-life of the products.

The composition can be in any form, e.g., in the form of tablets, pellets, pastilles, granules, or powders. To make tablets or pellets, the ingredients in the composition can be blended together, for example, at room temperature, and compressed to form tablets or pellets. The blends can be dry powder blends.

The composition of the present disclosure is desirably solid at room temperature (e.g., about 25° C.) and are soluble in cold, warm, and hot water, and can deliver long lasting fragrance impression.

In one embodiment, the composition solubilize in about 35 minutes or less, or about 30 minutes or less, or about 25 minutes or less, or about 20 minutes or less, or about 15 minutes or less, or about 10 minutes or less, or about 9 minutes or less, or about 8 minutes or less, as measured by a stir-bar method at 59 □F. in 120 ppm $Ca^{2+}/Mg^{2+}$ water, wherein the ratio of $Ca^{2+}:Mg^{2+}$ is 3:1.

The water solubility can be measured by methods known in the art by a person of ordinary skill in the art. The water solubility can be measured, for example, by stir-bar method at 59 □F. in 120 ppm $Ca^{2+}/Mg^{2+}$ water, wherein the ratio of $Ca^{2+}:Mg^{2+}$ is about 3:1.

In some embodiments, the encapsulated fragrance composition may comprise (a) a salt base or sugar base in an amount from about 50% to about 99.5% by weight of the composition; (b) a silicon compound in an amount from about 0.01% to about 10% by weight of the composition, wherein the silicon compound is selected from a group consisting of silicon dioxide, fumed silica, precipitated silica, aluminosilicate, sodium silicate, potassium silicate, calcium silicate, and a mixture thereof; and (c) an encapsulated fragrance slurry in an amount from about 0.01% to about 20% by weight of the composition. In some embodiments, the silicon compound can be added during a second addition at the end in an amount from about 0.01% to about 10% by weight of the composition.

In some embodiments, the composition comprises water is in an amount of less than 10% by weight, less than 8% by weight, less than 5% by weight, less than 3% by weight, less than 2% by weight, less than 1% by weight, or less than 0.5% by weight of the composition. There is essentially no free water in the composition, as all of water is either bound to another compound (such as silicon dioxide) or being part of a crystalline form of another compound in the final composition.

In further embodiments, the encapsulated fragrance composition further comprises a free fragrance, a colorant, a solvent (such as propylene glycol), or a combination thereof. The composition can further include other additives commonly included in a fabric treatment composition.

The types of the salt base or sugar base, the silicon compound, and the encapsulated fragrance slurry, and the respective amounts thereof, and an optional free fragrance suitable for use in the encapsulated fragrance composition, are the essentially same as those used in the inventive processes described herein. Detailed description about the above components will not be repeated.

In another embodiment, the composition is prepared by the processes described herein, which allows a high concentration of a salt base or sugar base (up to about 99.5% by weight) and relatively a low concentration of perfume.

The encapsulated fragrance composition may be incorporated in other laundry care, dishwashing, and home care products to impart a pleasant smell to the products.

In some embodiments, the encapsulated fragrance composition may be incorporated in detergent compositions. Accordingly, the present invention also provides a detergent composition, suitable for laundry care, dishwashing, or other home product applications, comprising the solid fragrance composition, as described herein, and a detergent. The detergent can comprise at least one detersive surfactant. All detersive surfactants suitable for use in a detergent (e.g., laundry application, etc.) composition can be used herein. The detersive surfactants include, but are not limited to an anionic surfactant, a nonionic surfactant, a cationic surfactant, an ampholytic surfactant, a zwitterionic surfactant, or mixtures thereof. In some embodiments, the detergent composition is packed in a conventional detergent package container. In other embodiments, the detergent composition is packed as unit doses (either in a single or multi-chamber unit dose). If a multi-chamber unit dose is the package form, the solid fragrance composition can by in its individual chamber, separated from the detersive composition. The unit doses may be configured such that the detersive composition and the solid fragrance composition can be released at the same or different times during a wash cycle.

Method of Use

The solid encapsulated fragrance composition of the present disclosure can be used to treat fabrics or textiles, e.g., to impart scent (i.e., apply fragrance to) or soften or clean or decrease static build up when the treated textile is subsequently dried. The composition can be used for delivering or applying fragrance or fabric care to a fabric or a textile, or cleaning a fabric or a textile, or combinations thereof by contacting the fabric or textile with a composition of the present disclosure.

The composition of the present disclosure can also be used to deliver fragrance to silverware, or a household product or surface by contacting the silverware, or the household product or surface with the composition.

In one embodiment, the subject to be treated is a textile or a fabric. To perform the treatment, the laundry detergent composition of the present invention, and unit doses containing thereof, can be used in a top loading or front loading washer, in hot, warm, or cold water. The composition, laundry detergent compositions, and unit doses (either in a single or multi-chamber unit dose) containing thereof can be used with a detergent in a wash cycle, or separately but in conjunction with a detergent (e.g., in a separate wash or rinse cycle).

In one embodiment is provided a textile treated by a composition, a unit dose, or a laundry detergent composition as disclosed herein.

The act of treating a textile can refer to, or example, one or more of: i) applying a perfume to a textile; ii) softening a textile; iii) applying a perfume to and softening a textile; iv) cleaning a textile; v) rendering the textile resistant to static build up during drying; or vi) cleaning a textile and applying a perfume to and softening a textile and rendering the textile resistant to static build up during drying; or any combination thereof.

The textile, after being treated, may be further processed, for example by drying, pressing, ironing, steaming, sewing, and the like.

EXAMPLES

Example 1

Preparation of a Salt Base or Sugar Base Composition Containing Encapsulated and Free Fragrances without a Pretreatment of the Salt Base or Sugar Base with a Silicon Compound A free fragrance (neat oil) and a dye (12.5% in propylene glycol) were mixed until they became homogeneous to form a premix. The fragrance/dye premix was further mixed with sodium chloride (powder) using a Kitchen aid stirrer at speed setting 3 for about 2 minutes until they became homogeneous. To the mixture, slowly added an encapsulated fragrance slurry (approximately 30% by weight encapsulated fragrance in approximately 70% by weight water) while stirring them by use of a Kitchen aid stirrer at speed setting 3. The final composition was mixed for about 40 minutes. The salt base or sugar base Composition A, which comprises encapsulated and free fragrances, was thus obtained. The formulation of Composition A is described in Table 1 below.

Example 2

Preparation of a Salt Base or Sugar Base Composition Containing an Encapsulated Fragrance with a Starch Layer Protection A starch and encapsulated fragrance slurry was prepared and spray-dried to prepare an encapsulated fragrance powder with double shell (which can be purchased as Supersoft MDRY Popscent 190870). The double shell encapsulated fragrance is slowly added to sodium chloride while stirring them by use of a Kitchen aid stirrer at speed setting 3. The final composition was mixed for about 40 minutes. The salt base or sugar base Composition B, which comprises double shell protected fragrance encapsulates, was thus obtained. The formulation of Composition B is described in Table 1 below.

Example 3

Preparation of a Salt Base or Sugar Base Composition Containing Encapsulated and Free Fragrances with a Pretreatment of the Salt Base or Sugar Base with a Silicon Compound A free fragrance (neat oil) and a dye (12.5% in propylene glycol) were mixed until they became homogeneous to form a premix and set it aside for a later use. Sodium chloride (powder) is mixed with silicon dioxide (Zeofree, powder) by use of a Kitchen aid stirrer until the two ingredients became homogeneous. The fragrance/dye premix was further added to blend with the sodium chloride/silicon dioxide mixture, again using a Kitchen aid stirrer at speed setting 3, for about 2 minutes, until the ingredients became homogeneous. To the resulting mixture, slowly added an encapsulated fragrance slurry (approximately 30% by weight encapsulated fragrance in approximately 70% by weight water) while stirring them by use of a Kitchen aid stirrer at speed setting 3. The final composition was mixed for about 40 minutes. The salt base or sugar base Composition C comprising encapsulated and free fragrances was thus obtained. The formulation of Composition C is described in Table 1 below.

Example 4

Preparation of a Salt Base or Sugar Base Composition Containing Encapsulated and Free Fragrances with Both Before- and After-Treatments of the Salt Base or Sugar Base with Silicon Compounds A free fragrance (neat oil) and a dye (12.5% in propylene glycol) were mixed until they became homogeneous to form a premix. The premix was added to sodium chloride (powder) and mixed using a Kitchen aid stirrer at speed setting 3, for about 2 minutes, until the ingredients became homogeneous. To the resulting mixture, silicone dioxide (Zeofree, powder) was added and mixed until homogeneous. To the resulting mixture with silicone dioxide and the salt, was slowly added an encapsulated fragrance slurry (approximately 30% by weight encapsulated fragrance in approximately 70% by weight water) while stirring them by use of a Kitchen aid stirrer at speed setting 3. The final salt base composition was mixed for about 40 minutes. Finally, a new batch of silicon dioxide was added to the salt base composition which contains encapsulated and free fragrances, and stirred so to obtain Composition D. The formulation of Composition D is described in Table 1 below.

TABLE 1

| Ingredient | | Composition A % wt | Composition B % wt | Composition C % wt | Composition D % wt |
|---|---|---|---|---|---|
| Premix | Fragrance | 1.000 | 0 | 1.000 | 1.000 |
| | Dye, 12.5% in propylene glycol | 0.004 | 0 | 0.004 | 0.004 |
| NaCl | | 97.096 | 98.50 | 96.846 | 92.746 |
| Silicon Dioxide (added first, to NaCl directly) | | 0 | 0 | 0.250 | 0.550 |
| Encapsulated fragrance (single shell, slurry, 30% active) | | 1.900 | 0 | 1.900 | 4.200 |
| Encapsulated fragrance (powder, double shell) | | 0 | 1.50 | 0 | 0 |
| Silicon Dioxide (added last) | | 0 | 0 | 0 | 1.5 |
| TEST: Breakage Rate | | 88.00% | 52.00% | 56% | 49.00% |

Example 5

Preparation of a Salt Base or Sugar Base Composition Containing Encapsulated and Free Fragrances on a Large Scale A free fragrance (neat oil, 50.77 lbs) and a dye (0.03 lbs) and propylene glycol (0.20 lbs) were mixed until they became homogeneous to form a premix. The premix was added to sodium chloride (4,806 lbs) and mixed by use of a ribbon blender until the ingredients became homogeneous. To the resulting mixture, silicone dioxide (Zeofree powder, 28.66 lbs) was added and mixed until the ingredients became homogeneous. To the mixture, sprayed the encapsulated fragrance slurry (approximately 30% by weight encapsulated fragrance in approximately 70% by weight water) (218.82 lbs) while stirring them by use of a ribbon blender. The final mixing step took about 4 minutes. Thereafter, a new batch of silicon dioxide (104.20 lbs) was added to the mixture which contains encapsulated and free fragrances, and stirred so as to obtain a batch of the final composition (5,209 lbs), which has a breakage rate of 41%.

Example 6

Test of Breakage Rate

Capsule breakage is measured by using two extraction methods: a hard extraction and a gentle wash. A harsh extraction breaks the capsules and extracts the total oil from the formula. In contrast, a gentle wash which does not damage the capsules and only dissolves free available fragrance. The respective extraction solvents from the two extractions are analyzed by GC/MS. A harsh extraction provides a "Total Capsule Signal" and a gentle wash provides a "Free Oil signal" from the output of GC/MS. To avoid interference between the fragrance entrapped in the encapsulates and the free fragrance (i.e., neat oil), different fragrance components for the encapsulates and for the neat oil are used to analyze for breakage.

The rate of capsule breakage is calculated as follows:

% Breakage=Free Capsule Oil Signal/Total Capsule Oil Signal*100

Each of Compositions A to D and the batch in Example 5 is worthwhile to mention that Composition D was also manufactured at a production scale of 5,000 lb, and the tested capsule breakage rate was about 41%.

From Table 1, it is obvious that premixing silicon dioxide with a salt base or sugar base before mixing with a fragrance encapsulate slurry advantageously reduces the rate of capsule breakage, compared to the prior art method. Having both premixing and after mixing of silicon dioxide with the salt base or sugar base, as shown in Composition D, provides the best result in terms of reducing the capsule breakage.

Example 7

Test of Percentage of Broken Capsules as a Function of Zeofree (Silicone Dioxide) Initially Added to the Salt Base or Sugar Base More salt base or sugar base encapsulated fragrance compositions were prepared, in accordance with the procedure in Example 4. The compositions were then subjected to breakage test as described in Example 6. The results are shown in Table 2.

TABLE 2

| Formulation No. | Protection (added to a salt base or sugar base directly) | Free Oil | wt % Free Oil | wt % Encapsulated Fragrance slurry, 30% active | wt % Protection (e.g., SiO$_2$) added to a salt base or sugar base | % Breakage (40 min mixing time) |
|---|---|---|---|---|---|---|
| 1 | — | Free Oil Type 1 | 1.00 | 1.90 | 0 | 74 |
| 2 | Zeofree | Free Oil Type 1 | 1.00 | 1.90 | 0.25 | 44 |
| 3 | Zeofree | Free Oil Type 1 | 1.00 | 1.90 | 0.55 | 54 |
| 4 | Zeofree | Free Oil Type 1 | 1.00 | 1.90 | 1.50 | 94 |
| 5 | — | Free Oil Type 2 | 1.00 | 1.90 | 0 | 88 |
| 6 | Zeofree | Free Oil Type 2 | 1.00 | 1.90 | 0.25 | 55 |
| 7 | Zeofree | Free Oil Type 2 | 2.30 | 1.90 | 0.25 | 96 |
| 8 | Zeofree | Free Oil Type 2 | 2.30 | 1.90 | 0.55 | 100 |

TABLE 2-continued

| Formulation No. | Protection (added to a salt base or sugar base directly) | Free Oil | wt % Free Oil | wt % Encapsulated Fragrance slurry, 30% active | wt % Protection (e.g., SiO$_2$) added to a salt base or sugar base | % Breakage (40 min mixing time) |
|---|---|---|---|---|---|---|
| 9 | Zeofree | Free Oil Type 2 | 2.30 | 1.90 | 1.00 | 93 |
| 10 | Zeofree | Free Oil Type 2 | 2.30 | 1.90 | 1.50 | 88 |
| 11 | Zeofree | Free Oil Type 2 | 2.30 | 1.90 | 2.00 | 74 |
| 12 | Zeofree | Free Oil Type 2 | 1.00 | 4.20 | 0.27 | 87 |
| 13 | Zeofree | Free Oil Type 2 | 1.00 | 4.20 | 0.55 | 47 |
| 14 | Zeofree | Free Oil Type 2 | 1.00 | 4.20 | 1.00 | 58 |
| 15 | Zeofree | Free Oil Type 2 | 1.00 | 3.00 | 0.40 | 64 |
| 16 | Zeofree | Free Oil Type 2 | 1.50 | 3.00 | 0.80 | 58 |
| 17 | Zeofree | Free Oil Type 1 | 1.10 | 3.00 | 0.40 | 48 |
| 18 | Zeofree | Free Oil Type 2 | 1.27 | 3.00 | 0.70 | 65* |
| 19 | Zeofree | Free Oil Type 3 | 1.40 | 3.00 | 0.80 | 64* |
| 20 | Zeofree | Free Oil Type 3 | 1.40 | 3.00 | 0.70 | 54* |
| 21 | Zeofree | Free Oil Type 3 | 1.40 | 3.00 | 0.60 | 60* |
| 22 | Zeofree | Free Oil Type 4 | 1.22 | 3.00 | 0.70 | 58* |
| 23 | Zeofree | Free Oil Type 4 | 1.22 | 3.00 | 0.60 | 61* |
| 24 | Zeofree | Free Oil Type 4 | 1.22 | 3.00 | 0.50 | 54* |

*The % breakage was measured after 35 minutes of mixing time.

Table 2 shows that there is a correlation between the percentage of broken capsules as a function of silicone dioxide added initially to a salt base or sugar base (prior to mixing with an encapsulated fragrance slurry. Too much or too little silicon dioxide to treat the salt base or sugar base will cause more broken capsules, when the free fragrance amount is fixed. According to a Panel testing, having less than 70% breakage of the encapsulate capsules provides a significant consumer benefit. The present invention can provide a breakage rate as low as 44%, much lower than 70%, which is significant.

In Formulation 1, the breakage rate is 44%. The formulation contains 1.00% wt of Lavender neat oil, the ratio between Zeofree and 30% encapsulated fragrance slurry is: 0.25:1.90=0.132; and the ratio between Zeofree and the active of 30% encapsulated fragrance slurry is: 0.25:1.90*0.3=0.44.

In Formulation 13, the breakage rate is 47%. The formulation contains 1.00% wt of Blue neat oil, the ratio between Zeofree and 30% encapsulated fragrance slurry is: 0.55:4.2=0.131; and the ratio between Zeofree and the active of 30% encapsulated fragrance slurry is: 0.55:4.2*0.3=0.44.

Following the teaching of the present invention, the ratio of silicon compound and fragrance encapsulates slurry for a fix concentration of free oil and/or solvent can be find by a person skilled to the art. Though the examples above cover limited concentrations of free fragrance, it should be understood that ratio with other concentration of free oil are covered under this invention.

The capsule breakage rate and the correlation is not affected by the type of free neat oil used. However, the amount of free neat oil used in the composition matters. The more fragrance oil is used in the composition, the more silicon dioxide powder is needed to provide the protection. Without wishing to be bound by theory, it is believed that the free fragrance oil hinders the protection provided by the silicon dioxide.

Having now fully described this invention, it will be understood by those of ordinary skill in the art that the same can be performed within a wide and equivalent range of conditions, formulations and other parameters without affecting the scope of the invention or any embodiment thereof. All patents, patent applications, and publications cited herein are fully incorporated by reference herein in their entirety.

The foregoing description of the specific embodiments has revealed the general nature of the invention such that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

What is claimed is:

1. A method for preparing an encapsulated fragrance composition comprising:
   blending a salt base or a sugar base in an amount from about 88% to about 93% by weight of the composition and a first batch silicon compound in an amount from about 0.01% to about 10% by weight of the composition to form a first mixture;
   optionally blending the first mixture with a free fragrance in an amount ranging from 0 to less than less than 10% by weight of the composition;
   wherein the first batch silicon compound is selected from a group consisting of silicon dioxide, fumed silica, precipitated silica, aluminosilicate, sodium silicate, potassium silicate, calcium silicate, and a mixture thereof;
   blending the first mixture, and optionally the free fragrance, and a fragrance encapsulate slurry to obtain a second mixture;
   wherein the encapsulated fragrance slurry comprises a fragrance encapsulate and water, with the fragrance encapsulate suspended in the water;
   wherein the fragrance encapsulate is present in the encapsulated fragrance slurry at a concentration of 30% to 40% by weight based on the total weight of the encapsulated fragrance slurry;
   wherein the fragrance encapsulate comprises a microcapsule and a fragrance entrapped in the microcapsule; and
   wherein the weight ratio of the first batch silicon compound and the fragrance encapsulate slurry is from 0.3 to 2.5.

2. The method of claim 1, wherein the weight ratio of the first batch silicon compound and the fragrance encapsulate slurry is from 0.1 to 0.2.

3. The method of claim 1, wherein the free fragrance in an amount ranging from about 1.0% to about 2.0% by weight of the composition.

4. The method of claim 1, wherein the encapsulated fragrance slurry is in an amount from about 0.01% to about 20% by weight of the composition.

5. The method of claim 1, wherein the encapsulated fragrance slurry is sprayed onto the first mixture.

6. The method of claim 1, wherein the salt base or the sugar base is a salt base comprising sodium chloride.

7. The method of claim 1, wherein the first batch silicon compound is silicon dioxide.

8. The method of claim 1, wherein the first batch silicon is from about 0.2% to about 1% by weight of the composition.

9. The method of claim 1, wherein the fragrance in the encapsulated fragrance slurry and the free fragrance are individually selected from a group consisting of an ester, an ether, an aldehyde, a ketone, an alcohol, a hydrocarbon, or a combination thereof.

10. The method of claim 1, wherein the encapsulated fragrance slurry is from about 0.04% by weight to about 5% by weight, based on the total weight of the composition.

11. The method of claim 1, wherein the microcapsule has a melamine/formaldehyde shell or a melamine acrylate/acrylamide shell.

12. The method of claim 1, wherein the salt base or the sugar base further comprises an alcoholic solvent as a carrier for the free fragrance.

13. The method of claim 12, wherein the alcoholic solvent is propylene glycol, dipropylene glycol, or a combination thereof.

14. The method of claim 1, further comprising:
   blending the second mixture and a second batch silicon compound,
   wherein the second batch silicon compound is in an amount from about 0.01% to about 10% by weight of the composition.

15. An encapsulated fragrance composition comprising:
   (a) a salt base or a sugar base in an amount from about 88% to about 93% by weight of the composition, wherein the salt base or the sugar base comprises an inorganic salt;
   (b) a silicon compound in an amount from about 0.01% to about 10% by weight of the composition, wherein the silicon compound is selected from a group consisting of silicon dioxide, fumed silica, precipitated silica, aluminosilicate, sodium silicate, potassium silicate, calcium silicate, and a mixture thereof;
   (c) a fragrance encapsulate slurry in an amount from about 0.01% to about 20% by weight of the composition, wherein the fragrance encapsulate comprises a microcapsule and a fragrance entrapped in the microcapsule;
   wherein the weight ratio of the silicon compound and the fragrance encapsulate is from 0.3 to 2.5;
   wherein the composition comprises water in an amount of less than 10% by weight of the composition.

16. The encapsulated fragrance composition of claim 15, wherein the microcapsule has a melamine/formaldehyde shell or a melamine acrylate/acrylamide shell, and
   wherein the fragrance in the fragrance encapsulate is an ester, an ether, an aldehyde, a ketone, an alcohol, a hydrocarbon, or a combination thereof.

17. The encapsulated fragrance composition of claim 15, wherein the weight ratio of the silicon compound and the fragrance encapsulate slurry is from 0.1 to 0.2.

18. The encapsulated fragrance composition of claim 15, further comprises a free fragrance in an amount ranging from about 0.01 to less than less than 2.3% by weight of the composition.

19. An encapsulated fragrance composition comprising:
   (a) a salt base or a sugar base in an amount from about 50% to about 99.5% by weight of the composition, wherein the salt base or the sugar base comprises an inorganic salt;
   (b) a silicon compound in an amount from about 0.01% to about 10% by weight of the composition, wherein the silicon compound is selected from a group consisting of silicon dioxide, fumed silica, precipitated silica, aluminosilicate, sodium silicate, potassium silicate, calcium silicate, and a mixture thereof;
   (c) a fragrance encapsulate slurry in an amount from about 0.01% to about 20% by weight of the composition, wherein the fragrance encapsulate comprises a microcapsule and a fragrance entrapped in the microcapsule;
   wherein the weight ratio of the silicon compound and the fragrance encapsulate is from 0.3 to 2.5;
   wherein the composition comprises water in an amount of less than 10% by weight of the composition; and
   wherein the salt base or the sugar base is a salt base comprising sodium chloride.

20. The encapsulated fragrance composition of claim 19, wherein the silicon compound is silicon dioxide.

* * * * *